United States Patent
Aoki et al.

(10) Patent No.: US 11,072,334 B2
(45) Date of Patent: Jul. 27, 2021

(54) VEHICLE CONTROL SYSTEM

(71) Applicant: Toyota Jidosha Kabushiki Kaisha, Aichi-ken (JP)

(72) Inventors: Kenichiro Aoki, Aichi-ken (JP); Tadashi Omachi, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 198 days.

(21) Appl. No.: 16/506,477

(22) Filed: Jul. 9, 2019

(65) Prior Publication Data

US 2020/0094836 A1 Mar. 26, 2020

(30) Foreign Application Priority Data

Sep. 26, 2018 (JP) .............................. JP2018-180484

(51) Int. Cl.
*B60W 30/18* (2012.01)
*B60W 50/00* (2006.01)

(52) U.S. Cl.
CPC .. *B60W 30/18163* (2013.01); *B60W 50/0098* (2013.01); *B60W 2420/42* (2013.01); *B60W 2420/52* (2013.01); *B60W 2554/801* (2020.02); *B60W 2710/18* (2013.01); *B60W 2710/20* (2013.01); *B60W 2720/10* (2013.01)

(58) Field of Classification Search
CPC ............................................. B60W 30/18163
See application file for complete search history.

(56) References Cited

U.S. PATENT DOCUMENTS

| | | | |
|---|---|---|---|
| 10,166,981 B2* | 1/2019 | Horita | B60W 30/18163 |
| 10,549,780 B2* | 2/2020 | Watanabe | B62D 15/0265 |
| 2016/0214612 A1 | 7/2016 | Kashiba et al. | |
| 2017/0240176 A1* | 8/2017 | Aoki | G08G 1/167 |
| 2017/0313311 A1* | 11/2017 | Niino | B60W 30/146 |
| 2018/0128635 A1* | 5/2018 | Nakamura | B60W 30/12 |
| 2019/0031202 A1* | 1/2019 | Takeda | B60T 8/171 |
| 2019/0061766 A1* | 2/2019 | Nishiguchi | B60W 30/18163 |
| 2019/0071094 A1* | 3/2019 | Nishiguchi | B62D 15/0255 |
| 2019/0084572 A1* | 3/2019 | Oishi | B62D 6/00 |
| 2019/0096258 A1* | 3/2019 | Ide | B62D 15/025 |
| 2019/0205674 A1* | 7/2019 | Silver | G05D 1/0223 |

(Continued)

FOREIGN PATENT DOCUMENTS

JP 2016-132421 A 7/2016

*Primary Examiner* — Alex C Dunn
(74) *Attorney, Agent, or Firm* — Dinsmore & Shohl LLP

(57) ABSTRACT

A vehicle control system includes: a vehicle recognition unit configured to recognize a rear lateral vehicle in an area rearward of the host vehicle; a remaining distance acquisition unit configured to acquire a remaining distance from a current position of the host vehicle to a position at which the host vehicle completes a lane change; a lane change availability determination unit configured to determine whether the lane change is available; and a vehicle control unit configured to control, when the lane change availability determination unit determines that the lane change is not available and the remaining distance is shorter than a first determination distance, steering of the host vehicle such that a position of the host vehicle in a vehicle width direction becomes a position closer to the second lane than a position when the remaining distance is longer than or equal to the first determination distance.

5 Claims, 7 Drawing Sheets

(56) References Cited

U.S. PATENT DOCUMENTS

| | | | |
|---|---|---|---|
| 2019/0271985 A1* | 9/2019 | Mimura | B60W 60/0011 |
| 2019/0329770 A1* | 10/2019 | Rajab | H04L 67/12 |
| 2020/0027351 A1* | 1/2020 | Gotoda | B60W 60/001 |
| 2020/0132498 A1* | 4/2020 | Matsumaru | G08G 1/096844 |
| 2020/0139987 A1* | 5/2020 | Sekiguchi | H04L 67/12 |

* cited by examiner

VEHICLE CONTROL SYSTEM

CROSS-REFERENCE TO RELATED APPLICATIONS

This application claims priority to Japanese Patent Application No 2018-180484 filed on Sep. 26, 2018, which is incorporated herein by reference in its entirety including the specification, drawings and abstract.

BACKGROUND

1. Technical Field

The disclosure relates to a vehicle control system.

2. Description of Related Art

Japanese Unexamined Patent Application Publication No. 2016-132421 (JP 2016-132421 A) describes a technique related to a system that executes automated vehicle driving control such that the vehicle merges into a target lane with automated driving. With this technique, when a host vehicle is not able to merge into a target lane with automated driving for other vehicles traveling in the target lane or other reasons, the host vehicle is controlled so as to stop in a driving lane in an orientation toward a boundary line between the driving lane and the target lane at a merging point.

SUMMARY

With the technique of JP 2016-132421 A, when the host vehicle is not able to merge into the target lane with automated driving, the host vehicle is controlled so as to stop in the driving lane. In this case, system assistance for automated driving interrupts, so a driver of the host vehicle is required to start moving the host vehicle again with manual driving. As described above, the technique of JP 2016-132421 A still has room for improvement in completing a lane change with automated driving as much as possible.

The disclosure provides a vehicle control system that is able to raise the possibility of completing a lane change with automated driving.

An aspect of the present disclosure is a vehicle control system mounted on a host vehicle, the vehicle control system includes: a vehicle recognition unit configured to recognize a rear lateral vehicle in an area rearward of the host vehicle, the rear lateral vehicle being included in nearby vehicles traveling in a second lane adjacent to a first lane in which the host vehicle travels; a remaining distance acquisition unit configured to acquire a remaining distance from a current position of the host vehicle to a position at which the host vehicle completes a lane change; a lane change availability determination unit configured to determine whether the lane change is available based on information acquired from the vehicle recognition unit; and a vehicle control unit configured to control, when the lane change availability determination unit determines that the lane change is not available and the remaining distance is shorter than a first determination distance, steering of the host vehicle such that a position of the host vehicle in a vehicle width direction becomes a position closer to the second lane than a position when the remaining distance is longer than or equal to the first determination distance.

In the above aspect, the vehicle recognition unit may be configured to recognize a front lateral vehicle in an area forward of the host vehicle, the front lateral vehicle being included in the nearby vehicles traveling in the second lane; and the vehicle control unit may be configured to control a speed of the host vehicle such that an inter-vehicle distance between the host vehicle and the front lateral vehicle is reduced when conditions i) to iii) are all met i) the lane change availability determination unit determines that the lane change is not available, ii) there are the front lateral vehicle and the rear lateral vehicle, and iii) the remaining distance is shorter than a predetermined second determination distance.

In the above aspect, the vehicle control unit may be configured to control the speed of the host vehicle such that the inter-vehicle distance between the host vehicle and the front lateral vehicle increases when conditions iv) to vi) are all met iv) the lane change availability determination unit determines that the lane change is not available, v) there is the front lateral vehicle, and vi) there is no rear lateral vehicle.

In the above aspect, the vehicle control unit may be configured to control the speed of the host vehicle such that an inter-vehicle distance between the host vehicle and the rear lateral vehicle increases when conditions vii) to ix) are all met vii) the lane change availability determination unit determines that the lane change is not available, viii) there is the rear lateral vehicle, and ix) there is no front lateral vehicle.

In the above aspect, the lane change availability determination unit may be configured to calculate time to collision with one of a nearby vehicle included in the nearby vehicles traveling in the second lane and determine that the lane change is available when the time to collision is longer than predetermined determination time.

With the vehicle control system according to the aspect of the disclosure, by monitoring a remaining distance to a position at which the vehicle completes a lane change, it is possible to detect a situation that the vehicle needs the give-way action of the rear lateral vehicle for a lane change of the vehicle. Then, when the remaining distance becomes shorter than the first determination distance, the position of the vehicle in the vehicle width direction is brought close to the adjacent lane. Thus, it is possible to convey a lane change intention of the vehicle to the rear lateral vehicle and induce the give-way action. Thus, the possibility of completing, a lane change with automated driving is raised.

According to the aspect of the disclosure, when the remaining distance becomes shorter than the second determination distance, the inter-vehicle distance between the vehicle and the front lateral vehicle is reduced. Thus, it is possible to convey a lane change intention of the vehicle to the rear lateral vehicle and induce the give-way action. Thus, the possibility of completing a lane change with automated driving is raised.

According to the aspect of the disclosure, when a lane change is not available and there is the front lateral vehicle and there is no rear lateral vehicle, the inter-vehicle distance between, the vehicle and the front lateral vehicle is increased. Thus, the vehicle is able to quickly shift into a situation that a lane change is available, so the possibility of completing a lane change with automated driving is raised.

According to the aspect of the disclosure, when the lane change is not available and there is the rear lateral vehicle and there is no front lateral vehicle, the inter-vehicle distance between the vehicle and the rear lateral vehicle is increased. Thus, the vehicle is able to quickly shift into a situation that a lane change is available, so the possibility of completing a lane change with automated driving is raised.

Determination as to whether a lane change is available may be carried out by comparing time to collision to a surrounding vehicle that travels in the second lane with the predetermined determination time. Thus, it is possible to accurately determine whether a lane change is available.

In this way, according to the aspect of the disclosure, it is possible to provide the vehicle control system that is able to raise the possibility of completing a lane change with automated driving.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings. In the following embodiments, when the number, count, quantity, amount, or range of each element is referred to, the disclosure is not limited thereto unless otherwise specified or apparently determined to that in principle. The structures, steps, and the like, that will be described in the following embodiments, are not always indispensable to the disclosure, unless otherwise specified or apparently determined to them in principle.

Figure 1:
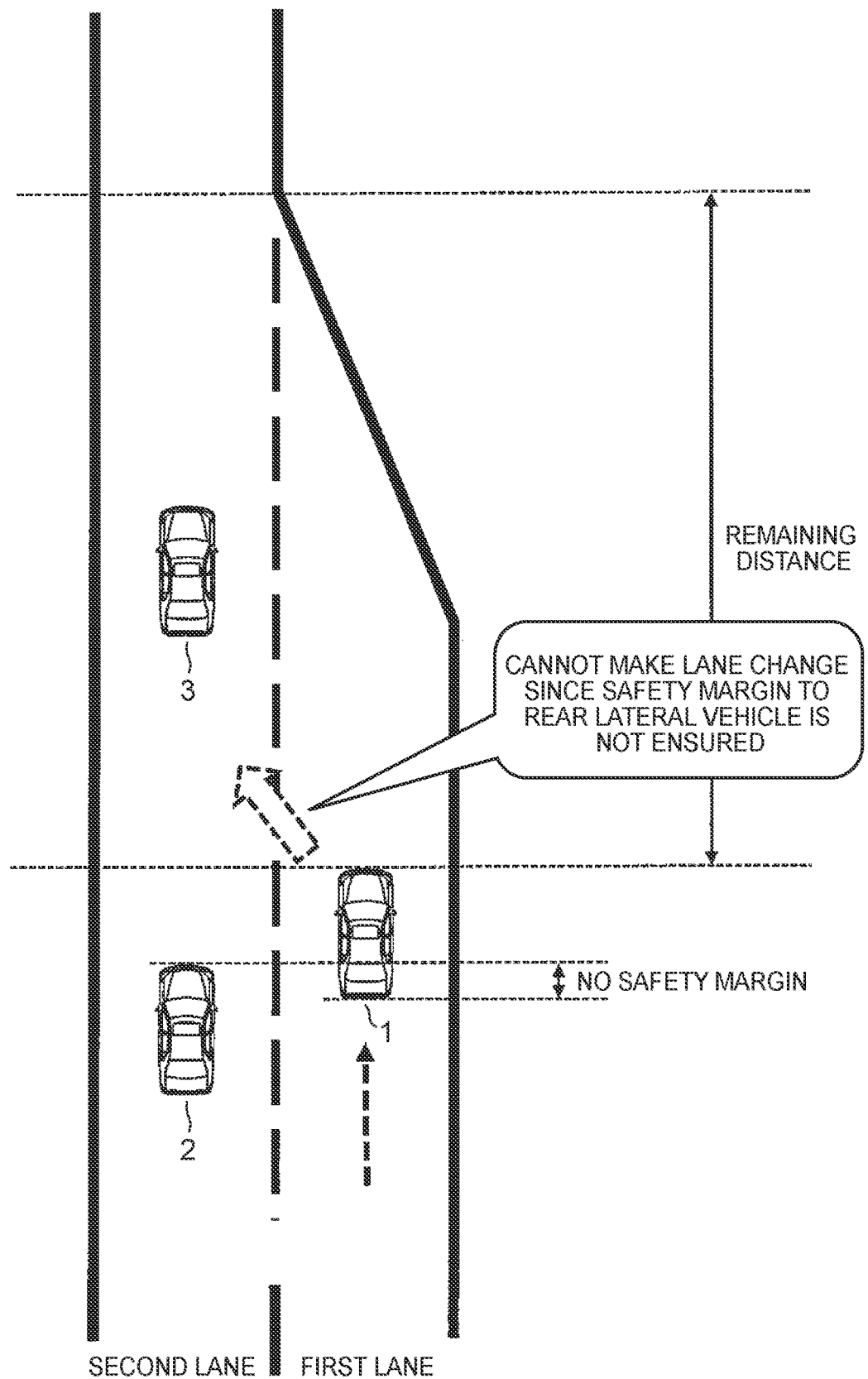
FIG. 1 is a schematic view for illustrating lane change control of a vehicle control system according to a first embodiment.

1. First Embodiment 1-1. Outline of Lane Change Control of Vehicle Control System FIG. 1 is a conceptual view for illustrating lane change control of a vehicle control system according to a first embodiment. The vehicle control system is mounted on a vehicle, and executes lane change control to make a lane change with automated driving. In the following description, the vehicle equipped with the vehicle control system is referred to as vehicle 1, and vehicles that travel around the vehicle 1 are referred to as surrounding vehicles. A lane in which the vehicle 1 is traveling is referred to as first lane, and, of lanes adjacent to the first lane, a target lane to which the vehicle 1 makes a lane change is referred to as second lane. Of the surrounding vehicles, a nearest following vehicle that travels in the second lane is referred to as rear lateral vehicle 2, and, of the surrounding vehicles, a nearest preceding vehicle that travels in the second lane is referred to as front lateral vehicle 3.

In lane change control, when the vehicle control system determines that the vehicle 1 needs a lane change in accordance with a lane plan, the vehicle control system automatically causes the vehicle 1 to make a lane change from the first lane to the second lane. At this time, the vehicle control system acquires information around the vehicle 1, and determines whether a lane change of the vehicle 1 is available based on the acquired surroundings information. The surroundings information contains an inter-vehicle distance and relative velocity to the rear lateral vehicle 2, and an inter-vehicle distance and relative velocity to the front lateral vehicle 3. When the vehicle control system determines that a lane change of the vehicle 1 is available, the vehicle control system causes the vehicle 1 to make a lane change to the second lane. On the other hand, when the vehicle control system determines that a lane change of the vehicle 1 is not available, the vehicle control system does not cause the vehicle 1 to make a lane change to the second lane and keeps the vehicle 1 traveling in the first lane. When the vehicle 1 has reached a point where the vehicle 1 should complete a lane change although the vehicle control system determines that a lane change of the vehicle 1 is not available, the vehicle control system stops the vehicle 1, terminates automated driving, and switches into driver's manual driving.

The inventors of the subject application became aware of the following concerns over the above-described vehicle control system. That is, it is difficult for the vehicle 1 in automated driving to communicate with drivers of the surrounding vehicles. For this reason, it is difficult for the vehicle 1 in automated driving to get an opportunity to make a lane change based on the give-way action of a surrounding vehicle, so the possibility of completing a lane change with automated driving may decrease.

Figure 2:
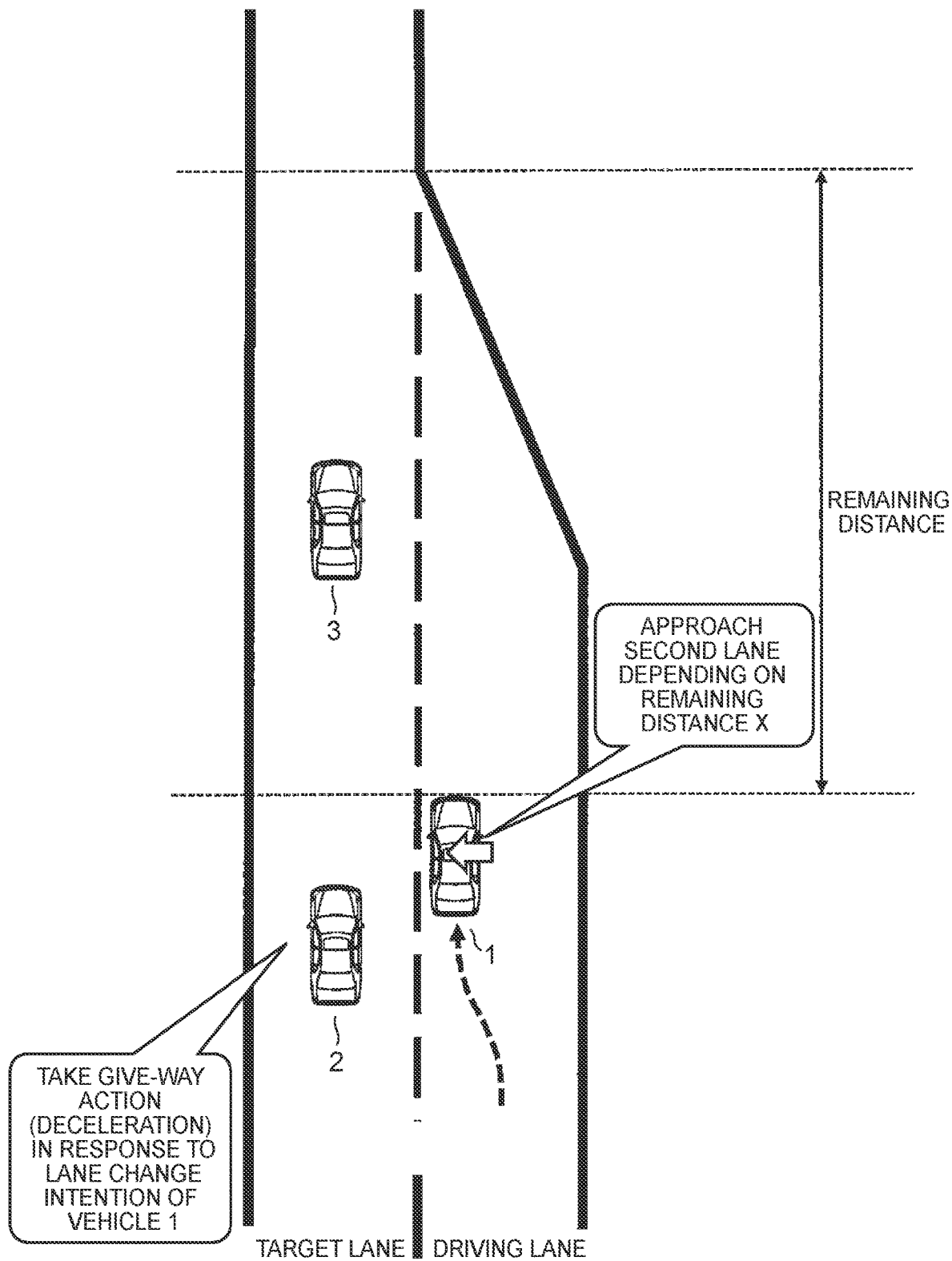
FIG. 2 is a conceptual view for illustrating lane change control of the vehicle control system according to the first embodiment.

Therefore, the vehicle control system according to the present embodiment performs an operation to induce the give-way action of a surrounding vehicle depending on a remaining distance from a current point of the vehicle 1 to a point where the vehicle 1 should complete a lane change. FIG. 2 is a conceptual view for illustrating lane change control of the vehicle control system according to the first embodiment. As shown in this drawing, when the remaining distance is shorter than a predetermined first determination distance, the vehicle control system brings the path of the vehicle 1 close to the second lane in the first lane. In the following description, a path along which the vehicle 1 travels while keeping the first lane is referred to as lane keeping path, and a path along which the vehicle 1 makes a lane change from the first lane to the second lane is referred to as lane change path. A path shifted by the vehicle 1 from the lane keeping path toward the second lane in the first lane is referred to as offset path. When the vehicle 1 travels along such an offset path, the position of the vehicle 1 in a vehicle width direction approaches the second lane. Such a behavior of the vehicle 1 expresses a lane change intention to surrounding vehicles. When the rear lateral vehicle 2 takes give-way action, such as deceleration, in response to the behavior that the vehicle 1 travels along the offset path, the possibility of ensuring a safety margin for a safe lane change in front of the rear lateral vehicle 2 increases. As a result, the possibility of determining that a lane change of the vehicle 1 is available rises.

When the vehicle 1 travels along the offset path although there is a sufficient remaining distance, the rear lateral vehicle 2 that the vehicle 1 may allow to pass by can be forced to decelerate. Forcing a surrounding vehicle to decelerate like this can interfere with smooth traffic, so it is undesirable. Therefore, the vehicle control system according to the present embodiment causes the vehicle 1 to travel along a path depending on a remaining distance to complete a lane change without causing the rear lateral vehicle 2 to take give-way action, such as deceleration, as much as possible. Specifically, when the remaining distance is shorter than the predetermined first determination distance, the vehicle control system causes the vehicle 1 to travel along the offset path. The first determination distance is set to, for example, a lower limit of the remaining distance required to attain an opportunity to make a lane change from the viewpoint of giving priority to maintaining smooth traffic. Thus, it is possible to raise the possibility of completing a lane change with automated driving while reducing the possibility of interfering with smooth traffic.

1-2. Example of Configuration of Vehicle Control System

Figure 3:
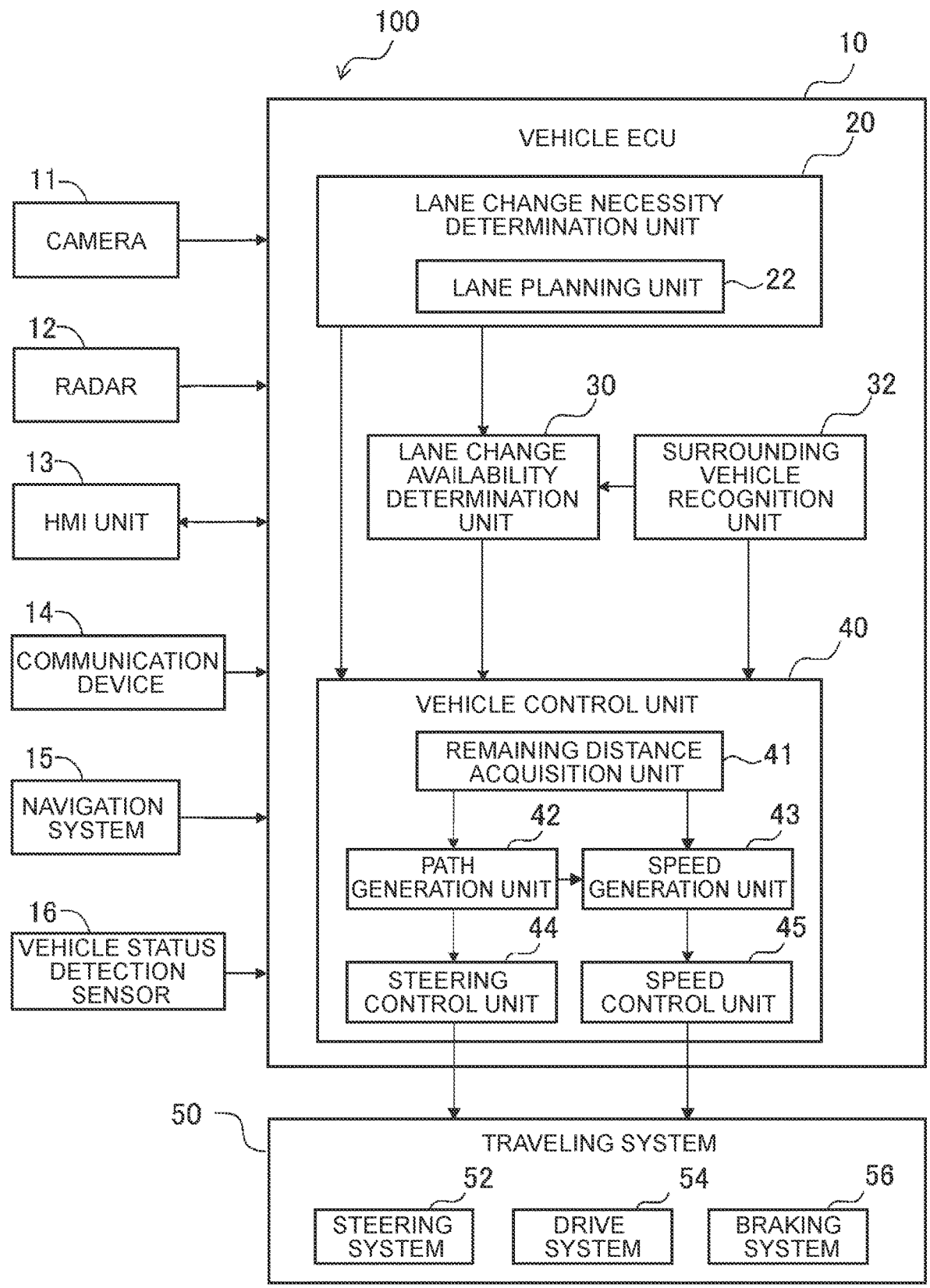
FIG. 3 is a diagram showing the schematic configuration of the vehicle control system of the first embodiment.

Next, an example of the configuration of the vehicle control system that executes the above-described lane change control will be described. FIG. 3 is a diagram showing the schematic configuration of the vehicle control system of the first embodiment. The vehicle control system 100 shown in FIG. 3 is mounted on the vehicle 1, and executes automated driving control to control the automated driving of the vehicle 1.

As shown in FIG. 3, the vehicle control system 100 includes a vehicle electronic control unit (ECU) 10 mounted on the vehicle 1. The vehicle control system 100 includes a camera 11, a radar 12, an HMI unit 13, a communication device 14, a navigation system 15, and a vehicle status detection sensor 16 that are connected to the input side of the vehicle ECU 10. The vehicle control system 100 further includes a steering system 52, a drive system 54, and a braking system 56 as a traveling system 50 that is connected to the output side of the vehicle ECU 10.

The camera 11 includes, for example, a front camera, a right rear camera, and a left rear camera. The front camera captures an image ahead of the vehicle 1. The right rear camera captures an image behind and to the right side of the vehicle 1. The left rear camera captures an image behind and to the left side of the vehicle 1. The camera 11 functions as an information acquisition unit that acquires information around the vehicle 1. The images captured by the camera 11 are transmitted to the vehicle ECU 10 as image data each time, and each piece of the image data is subjected to image processing in the vehicle ECU 10. Surroundings information that is acquired by the camera 11 is, for example, the position information of a surrounding vehicle that travels around the vehicle 1, road information, such as white line information and traffic signal information, and other information.

The radar 12 is, for example, a laser radar, a millimeter-wave radar, or another radar. The radar 12 functions as an information acquisition unit that acquires information around the vehicle 1. The radar 12 sends out laser waves or other waves to both forward rearward of the vehicle 1, and receives reflected waves of the waves. Thus, the radar 12 acquires information around the vehicle 1. Examples of the surroundings information that is acquired by the radar 12 include information as to whether there is a surrounding vehicle, information about a distance to the surrounding vehicle, information about the angle (that is, relative position) of the surrounding vehicle, information about the velocity (relative velocity) of the surrounding vehicle, and information about the positions of utility poles, buildings, and the like. Pieces of information, detected by the radar 12, are transmitted to the vehicle ECU 10 each time.

The HMI unit 13 is an interface for providing information to the driver of the vehicle 1 and also receiving information from the driver. For example, the HMI unit 13 includes an input device, a display device, and a speaker. Examples of the input device include a touch panel, a keyboard, a switch, and a button. Particularly, the input device includes an automated driving switch for turning on or off an automated driving function. The driver is allowed to input information such as a destination to the HMI unit 13 with the input device. Pieces of information input by the driver are transmitted to the vehicle ECU 10 each time.

The communication device 14 functions as an information acquisition unit that receives surroundings information from a roadside device on a road via an antenna provided on the vehicle 1. The roadside device is, for example, a beacon that transmits traffic congestion information, lane-specific traffic information, regulation information such as temporary stop, information about the traffic situation of a blind spot, or other information. The communication device 14 functions as an information acquisition unit that communicates with a surrounding vehicle around the vehicle 1 directly or by way of a relay (not shown) via the antenna. Examples of the surroundings information that is acquired by the communication device 14 include information about the position of the surrounding vehicle and information about the speed of the surrounding vehicle. Pieces of information received by the communication device 14 are transmitted to the vehicle ECU 10 each time.

The navigation system 15 detects the current position of the vehicle 1 from GPS satellites via the antenna, and, for example, detects the travel speed of the vehicle 1 or guides a route to a destination with a GPS, a speed sensor, a gyroscope, and the like. Map data containing detailed road information is incorporated in the navigation system 15. The map data contains, for example, information about the shape, number of lanes, and lane width of each road. Information about the current position, road information, or other information acquired by the navigation system 15 is transmitted to the vehicle ECU 10 each time.

The vehicle status detection sensor 16 detects the travel status of the vehicle 1. Examples of the vehicle status detection sensor 16 include a vehicle speed sensor, a lateral acceleration sensor, and a yaw rate sensor. Information detected by the vehicle status detection sensor 16 is transmitted to the vehicle ECU 10.

The steering system 52 is made up of a steering and a steering actuator. The steering system 52 automatically controls a steering angle irrespective of driver's steering operation. The steering is a general steering system that turns the direction of wheels in response to driver's steering operation. The steering actuator changes the direction of the wheels as automated steering based on a command from a steering control unit 44 (described later) aside from driver's steering operation.

The drive system 54 is a drive source of the vehicle 1, and is, for example, an engine. Driving force that is generated by the drive system 54 is transmitted to drive wheels via a power transmission path (not shown). An injection amount and injection timing of fuel, a throttle opening degree, and the like, of the engine serving as the drive system 54 are controlled by a speed control unit 45 (described later). Thus, the driving force of the vehicle 1 is controlled.

The braking system 56 is made up of a brake device and a brake actuator. The braking system 56 automatically applies braking force to the wheels irrespective of driver's braking operation. The brake device is a general brake device, such as a full-air brake device that generates braking force on the front wheels and the rear wheels by using air pressure in response to driver's depressing operation on a brake pedal. The brake actuator generates braking force of a selected magnitude on each wheel as automatic brake based on a command from the speed control unit 45 (described later) aside from driver's braking operation.

1-3. Description of Functions of Vehicle ECU

The vehicle control system 100 executes automated driving control to control the automated driving of the vehicle 1. The vehicle control system 100 includes the vehicle electronic control unit (ECU) 10. The vehicle ECU 10 is a microcomputer including an input/output interface, a memory, and a processor. The vehicle ECU 10 receives information from the camera 11, the radar 12, the HMI unit 13, the communication device 14, the navigation system 15, and the vehicle status detection sensor 16, and executes automated driving control based on the received information. Specifically, the vehicle ECU 10 sets up a travel plan of the vehicle 1, and controls the traveling system 50 such that the vehicle 1 travels in accordance with the travel plan.

The vehicle ECU 10 executes lane change control in the automated driving control of the vehicle ECU 10. In the lane change control, the vehicle ECU 10 causes the vehicle 1 to change the driving lane in accordance with the travel plan. The vehicle ECU 10 includes a lane change necessity determination unit 20, a surrounding vehicle recognition unit 32, a lane change availability determination unit 30, and a vehicle control unit 40 as functional blocks for implementing the lane change control or control associated with the lane change control.

The lane change necessity determination unit 20 includes a Jane planning unit 22. The lane planning unit 22 sets up a lane plan based on destination information that is transmitted from the HMI unit 13 and map information that is transmitted from the navigation system 15. The lane plan contains planned driving lanes in which the vehicle 1 travels. The lane change necessity determination unit 20 determines whether the vehicle 1 needs to make a lane change based on the set-up lane plan and the self-position that is transmitted from the navigation system 15. The result of determination as to whether the vehicle 1 needs to make a lane change is transmitted to the lane change availability determination unit 30.

The surrounding vehicle recognition unit 32 is a functional block for recognizing the status of a surrounding vehicle that travels around the vehicle 1. Specifically, the surrounding vehicle recognition unit 32 acquires surrounding vehicle information from the camera 11, the radar 12, the communication device 14, and the navigation system 15 that are the information acquisition units. Examples of the surrounding vehicle information include whether there is the rear lateral vehicle 2 that travels behind in the second lane, the position and vehicle speed of the rear lateral vehicle 2, whether there is the front lateral vehicle 3 that travels ahead in the second lane, and the position and vehicle speed of the front lateral vehicle 3. The surrounding vehicle recognition unit 32 recognizes the relative distance L and relative velocity V between the vehicle 1 and the recognized surrounding vehicle based on the surrounding vehicle information and the current vehicle speed of the vehicle 1, which is transmitted from the vehicle status detection sensor 16. The recognized surrounding vehicle information is transmitted to the lane change availability determination unit 30 and the vehicle control unit 40.

The lane change availability determination unit 30 is a functional block that determines whether a lane change is available when information indicating that the vehicle 1 needs to make a lane change has been transmitted from the lane change necessity determination unit 20. The lane change availability determination unit 30 calculates time to collision (TTC) between the vehicle 1 and the rear lateral vehicle 2 based on the relative distance L and relative velocity V recognized by the surrounding vehicle recognition unit 32. When the calculated TTC is longer than or equal to predetermined determination time, the lane change availability determination unit 30 determines that a lane change of the vehicle 1 to the second lane is available. The determined result is transmitted to the vehicle control unit 40.

The vehicle control unit 40 is a functional block that functions as a vehicle control unit that controls the automated driving of the vehicle 1 based on information transmitted from the lane change necessity determination unit 20, the lane change availability determination unit 30, and the surrounding vehicle recognition unit 32. Specifically, the vehicle control unit 40 includes a remaining distance acquisition unit 41, a path generation unit 42, a speed generation unit 43, a steering control unit 44, and the speed control unit 45.

The remaining distance acquisition unit 41 calculates a remaining distance X from the current position of the vehicle 1 to a target position to complete a lane change based on the set-up lane plan. For example, when the first lane is a merging lane to the second lane, the target position can be set to the termination of the merging lane from which the lane width begins to narrow. Alternatively, the target position may be set to a braking start point to stop at the termination of the merging lane for the current vehicle speed. The remaining distance acquisition unit 41 recognizes the target position based on the surroundings information acquired from the camera 11, the radar 12, and the navigation system 15 that are the information acquisition units. The remaining distance acquisition unit 41 acquires a distance from the self-position that is transmitted from the navigation system 15 to the target position as the remaining distance X. The acquired remaining distance X is transmitted to the path generation unit 42 and the speed generation unit 43.

The path generation unit 42 generates a target path of the vehicle 1 based on the information transmitted from the lane change necessity determination unit 20, the lane change availability determination unit 30, and the remaining distance acquisition unit 41. For example, when information indicating that the vehicle 1 does not need to make a lane change has been transmitted from the lane change necessity determination unit 20, the path generation unit 42 generates a lane keeping path. When information indicating that the vehicle 1 needs to make a lane change has been transmitted from the lane change necessity determination unit 20 and information indicating that a lane change is available has been transmitted from the lane change availability determination unit 30, the path generation unit 42 generates a lane change path. Furthermore, when information indicating that the vehicle 1 needs to make a lane change has been transmitted from the lane change necessity determination unit 20 and information indicating that a lane change is not available has been transmitted from the lane change availability determination unit 30, the path generation unit 42 generates an offset path based on the remaining distance X transmitted from the remaining distance acquisition unit 41. A specific process that is executed by the path generation unit 42 will be described in accordance with a flowchart (described later).

The speed generation unit 43 generates a target speed of the vehicle 1 based on information transmitted from the path generation, unit 42, the surrounding vehicle recognition unit 32, the lane change availability determination unit 30, and the remaining distance acquisition unit 41. For example, the speed generation unit 43 generates a target speed for realizing the target path transmitted by the path generation unit 42 while ensuring a safety margin to the surrounding vehicle recognized by the surrounding vehicle recognition unit 32. In the following description, the target speed of the vehicle 1 traveling in the lane keeping path is referred to as lane keeping speed, and the target speed of the vehicle 1 traveling in the lane change path is referred to as lane change speed.

The steering control unit 44 determines the operation amount of the steering system 52 for realizing the target path. The speed control unit 45 determines the operation amounts of the drive system 54 and braking system 56 for realizing the target speed.

1-4. Specific Process of Lane Change Control

Figure 4:
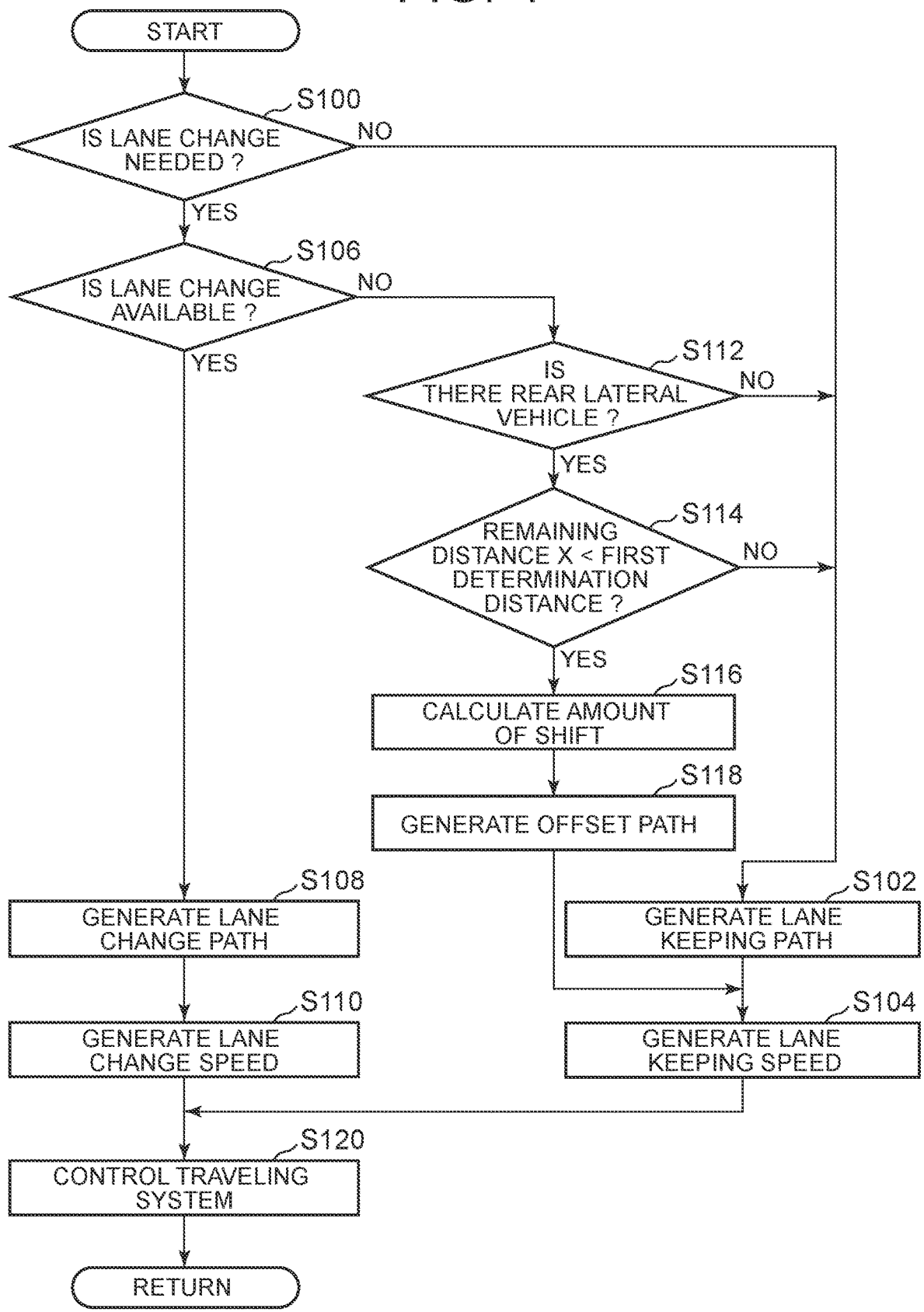
FIG. 4 is a flowchart showing the routine of lane change control that is executed in the first embodiment.

Next, the specific process of the lane change control that is executed by the vehicle control system 100 of the first embodiment with the above-described configuration will be described with reference to the flowchart. FIG. 4 is a flowchart showing the routine of the lane change control that is executed in the first embodiment. The routine shown in FIG. 4 is repeatedly executed by the vehicle ECU 10 at predetermined control intervals (for example, intervals of 0.1 sec) during the automated driving of the vehicle 1.

As the routine shown in FIG. 4 is started, first, the lane change necessity determination unit 20 of the vehicle ECU 10 determines whether the vehicle 1 needs to make a lane change based on a set-up lane plan, and a self-position that is transmitted from the navigation system 15 (step S100). As a result, when the lane change necessity determination unit 20 determines that the vehicle 1 does not need to make a lane change, the vehicle ECU 10 generates a lane keeping path (step S102).

When the lane keeping path is generated in step S102, the speed generation unit 43 of the vehicle control unit 40 subsequently generates a lane keeping speed (step S104). The speed generation unit 43 generates a speed for causing the vehicle 1 to travel along the lane keeping path transmitted from the path generation unit 42 while ensuring a safety margin to the surrounding vehicle recognized by the surrounding vehicle recognition unit 32, as the lane keeping speed.

On the other hand, when the lane change necessity determination unit 20 determines in the process of step S100 that the vehicle 1 needs to make a lane change, the lane change availability determination unit 30 of the vehicle ECU 10 determines whether a lane change is available (step S106). As a result, when the lane change availability determination unit 30 determines that a lane change is available, the vehicle ECU 10 generates a lane change path (step S108).

When the lane change path is generated in step S108, the speed generation unit 43 of the vehicle control unit 40 subsequently generates a lane change speed (step S110). The speed generation unit 43 generates a speed for causing the vehicle 1 to travel along the lane change path transmitted from the path generation unit 42 while ensuring a safety margin to the surrounding vehicle recognized by the surrounding vehicle recognition unit 32, as the lane change speed.

On the other hand, when the lane change availability determination unit 30 determines in the process of step S106 that a lane change is not available, the surrounding vehicle recognition unit 32 of the vehicle ECU 10 determines whether there is the rear lateral vehicle 2 (step S112). As a result, when the surrounding vehicle recognition unit 32 determines that there is no rear lateral vehicle 2, the process proceeds to step S102.

On the other hand, when the surrounding vehicle recognition unit 32 determines in the process of step S112 that there is the rear lateral vehicle 2, the process proceeds to the next step. In the next step, the vehicle ECU 10 determines whether the remaining distance X is shorter than the predetermined first determination distance (step S114). The vehicle control unit 40 compares the remaining distance X acquired by the remaining distance acquisition unit 41 with the first determination distance. The first determination distance is set to, for example, a lower limit of the remaining distance required to attain an opportunity to make a lane change from the viewpoint of giving priority to maintaining smooth traffic. As a result, when the vehicle ECU 10 determines that the remaining distance X is not shorter than the first determination distance, the process proceeds to step S102.

On the other hand, when the vehicle ECU 10 determines in the process of step S114 that the remaining distance X is shorter than the first determination distance, the process proceeds to the next step. In the next step, the path generation unit 42 of the vehicle control unit 40 calculates the amount of shift of the path (step S116). The path generation unit 42 calculates the amount of shift of the lane keeping path for bringing the position of the vehicle 1 in the vehicle width direction close to the second lane. For example, the path generation unit 42 calculates the amount of shift, which brings the vehicle 1 closest to the second lane within the first lane, based on the map information and self-position that are transmitted from the navigation system 15, white line information that is transmitted from the camera 11, and other information. After that, the path generation unit 42 generates an offset path based on the calculated amount of shift (step S118). When the offset path is generated in step S118, the process proceeds to step S104.

When the process of step S104 or step S110 is executed, the vehicle ECU 10 subsequently controls the steering and speed of the vehicle 1 (step S120). The steering control unit 44 determines the operation amount of the steering system 52 for realizing the target path, and controls the steering system 52. In addition, the speed control unit 45 determines the operation amounts of the drive system 54 and braking system 56 for realizing the target speed, and controls the drive system 54 and the braking system 56.

With such control, since the offset path is generated depending on the remaining distance X, the possibility of completing, a lane change with automated driving is raised.

2. Second Embodiment

Next, a vehicle control system of a second embodiment will be described.

2-1. Configuration of Vehicle Control System According to Second Embodiment

The configuration of the vehicle control system according to the second embodiment is the same as that of the vehicle control system 100 of the first embodiment shown in FIG. 3. Therefore, the detailed description of the vehicle control system according to the second embodiment is omitted.

2-2. Characteristic Function of Vehicle Control System According to Second Embodiment In the vehicle control system 100 of the first embodiment, when the remaining distance X is shorter than the predetermined first determination distance, the vehicle 1 travels along the offset path to induce the give-way action of the rear lateral vehicle 2. The vehicle control system 100 according to the second embodiment has a characteristic in the operation to further induce the give-way action of the rear lateral vehicle 2 by reducing an inter-vehicle distance to the front lateral vehicle 3 when there are both the front lateral vehicle 3 and the rear lateral vehicle 2.

Figure 5:
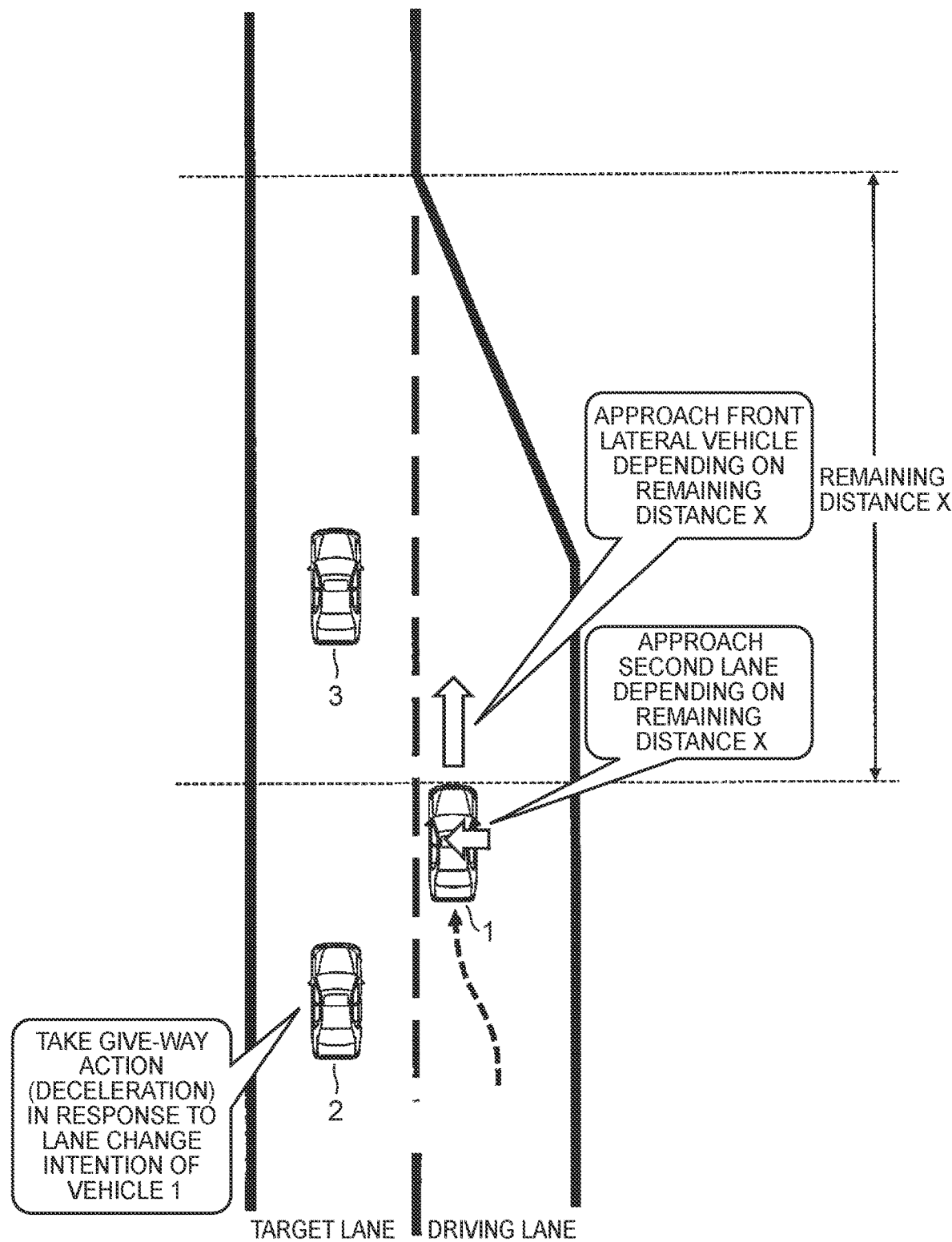
FIG. 5 is a conceptual view for illustrating lane change control of a vehicle control system according to a second embodiment.

FIG. 5 is a conceptual view for illustrating lane change control of the vehicle control system according to the second embodiment. As shown in this drawing, when there is the rear lateral vehicle 2 and the remaining distance X is shorter than the predetermined first determination distance, the vehicle control system 100 controls the steering of the vehicle 1 such that the vehicle 1 travels along the offset path. This operation is similar to that of the vehicle control system 100 of the first embodiment. When there is not only the rear lateral vehicle 2 but also the front lateral vehicle 3 and the remaining distance X is shorter than a predetermined second determination distance, the vehicle control system 100 controls the speed of the vehicle 1 such that the inter-vehicle distance to the front lateral vehicle 3 reduces. In the following description, this speed is referred to as inter-vehicle distance reduction speed. When the vehicle 1 travels at the inter-vehicle distance reduction speed, the vehicle 1 is able to express a lane change intention to the rear lateral vehicle 2. When the rear lateral vehicle 2 takes give-way action, such as deceleration, in response to such behavior of the vehicle 1, the possibility of ensuring a safety margin in front of the rear lateral vehicle 2 rises. Thus, the possibility of determining that a lane change of the vehicle 1 is available rises.

When the vehicle 1 travels such that the inter-vehicle distance to the front lateral vehicle 3 reduces although there is a sufficient remaining distance X, the rear lateral vehicle 2 that the vehicle 1 may allow to pass by can be forced to decelerate. Forcing a surrounding vehicle to decelerate like this can interfere with smooth traffic, so it is undesirable. Therefore, the vehicle control system according to the present embodiment travels at a speed depending on a remaining distance to complete a lane change without causing the rear lateral vehicle 2 to take give-way action, such as deceleration, as much as possible. Specifically, when the remaining distance is shorter than the predetermined second determination distance, the vehicle control system controls the speed such that the inter-vehicle distance to the front lateral vehicle 3 reduces. The second determination distance is set to, for example, a lower limit of the remaining distance required to attain an opportunity to make a lane change from the viewpoint of giving priority to maintaining smooth traffic. The second determination distance is not necessarily the same value as the first determination distance. Thus, it is possible to raise the possibility of completing a lane change with automated driving while reducing the possibility of interfering with smooth traffic.

In the lane change control of the vehicle control system according to the second embodiment, speed control as described below may be executed. When there is the rear lateral vehicle 2 and there is no front lateral vehicle 3, the speed of the vehicle 1 may be controlled such that the inter-vehicle distance to the rear lateral vehicle 2 increases. In the following description, the speed for ensuring a safety margin between the rear lateral vehicle 2 and the vehicle 1 is referred to as rear lateral margin ensuring speed. When the vehicle 1 travels at the rear lateral margin ensuring speed, time that takes until a safety margin to the rear lateral vehicle 2 is ensured is reduced. Thus, the possibility of completing a lane change with automated driving is raised.

On the other hand, when there is the front lateral vehicle 3 and there is no rear lateral vehicle 2, the speed of the vehicle 1 may be controlled such that the inter-vehicle distance to the front lateral vehicle 3 increases. In the following description, the speed for ensuring a safety margin between the front lateral vehicle 3 and the vehicle 1 is referred to as front lateral margin ensuring speed. When the vehicle 1 travels at the front lateral margin ensuring speed, time that takes until a safety margin to the front lateral vehicle 3 is ensured is reduced. Thus, the possibility of completing a lane change with automated driving is raised.

2-3. Specific Process of Lane Change Control

Figure 6:
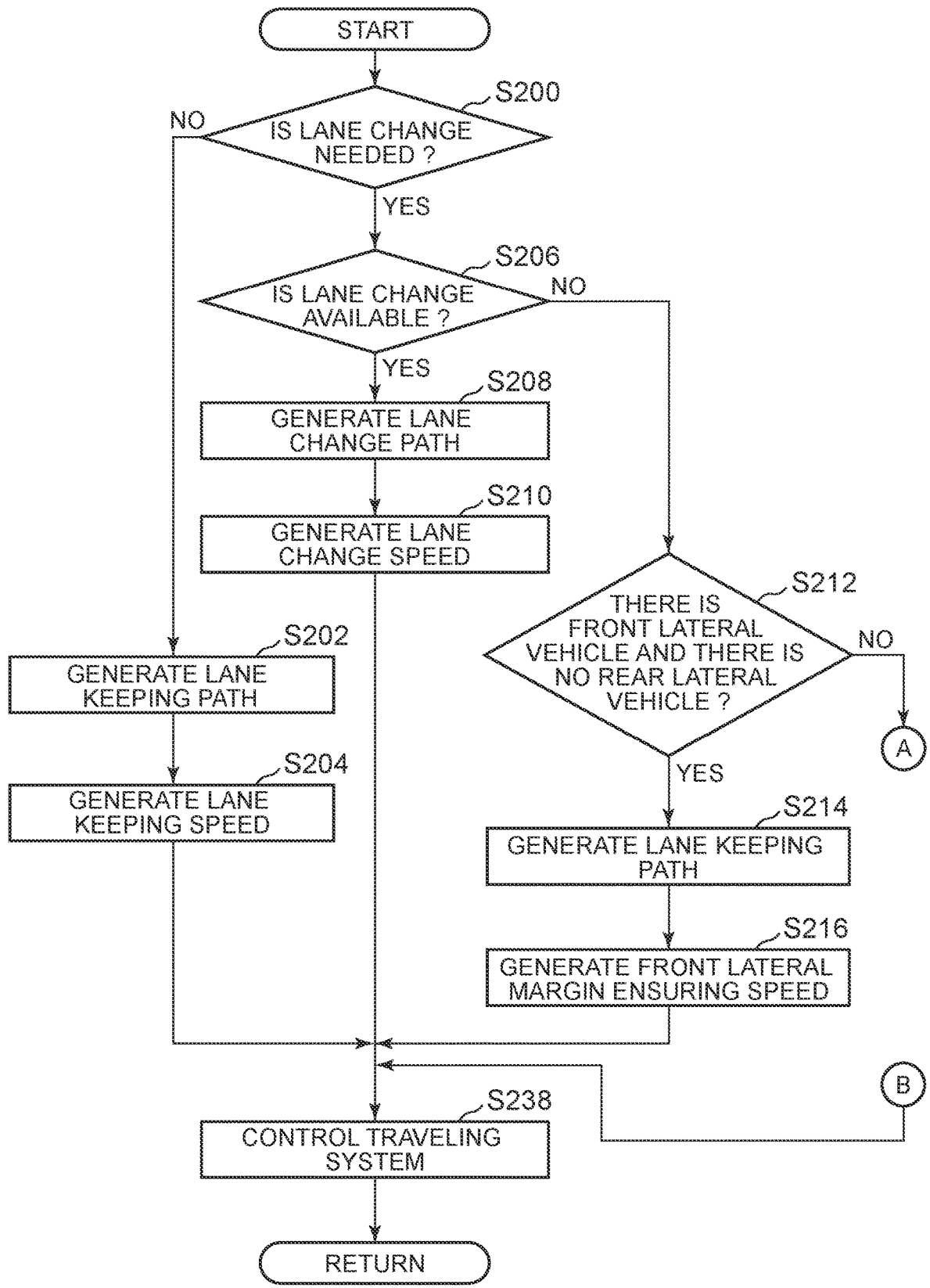
FIG. 6 is a flowchart showing, part of the routine of the lane change control that is executed in the second embodiment.
Figure 7:
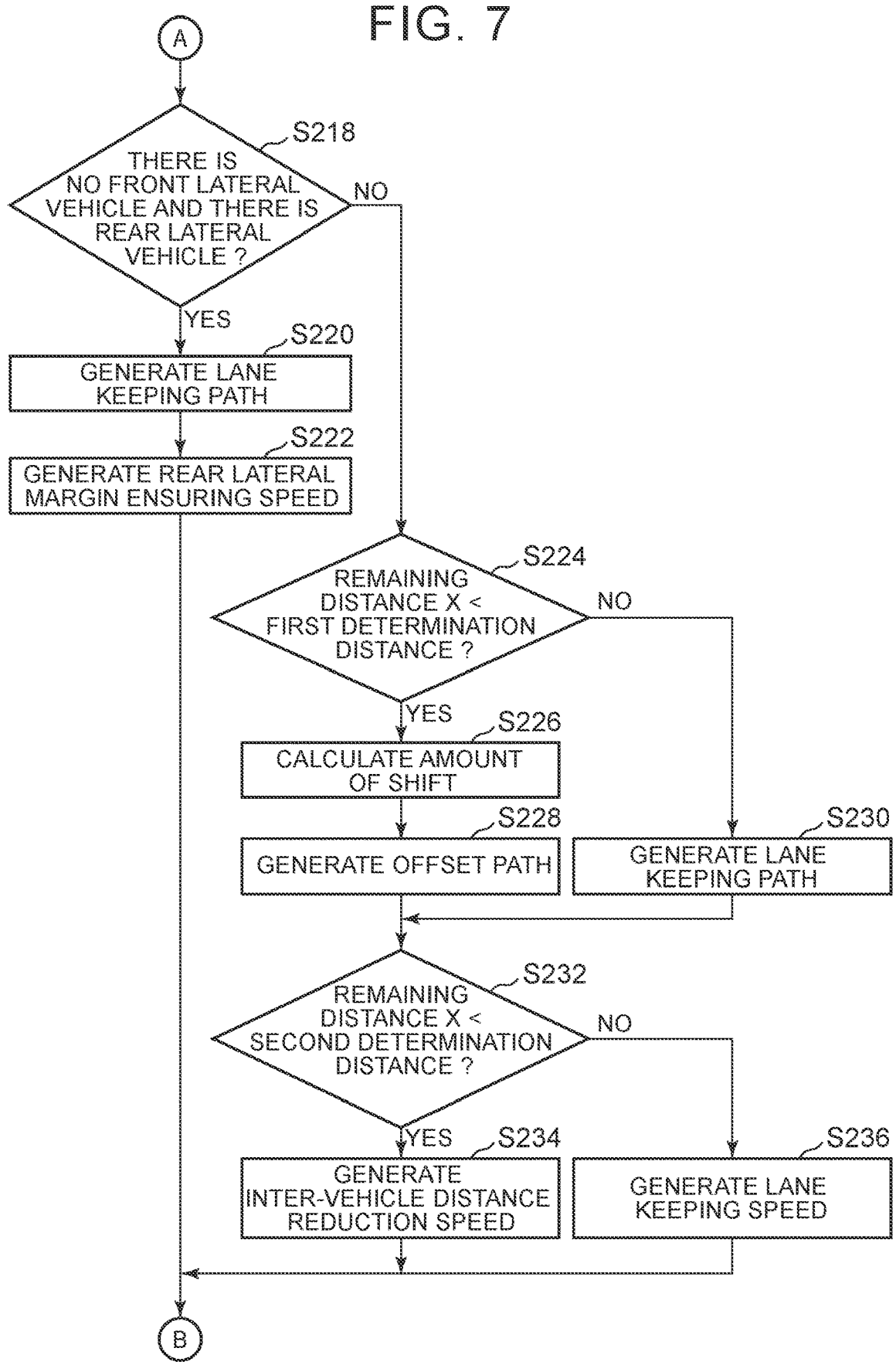
FIG. 7 is a flowchart showing the other part of the routine of the lane change control that is executed in the second embodiment.

Next, the specific process of the lane change control that is executed by the vehicle control system 100 of the second embodiment with the above-described configuration will be described with reference to the flowchart. FIG. 6 and FIG. 7 are flowcharts showing the routine of the lane change control that is executed in the second embodiment. A and B in FIG. 6 respectively correspond to A and B in FIG. 7. The routine shown in FIG. 6 and FIG. 7 is repeatedly executed by the vehicle ECU 10 at predetermined control intervals (for example, intervals of 0.1 sec) during the automated driving of the vehicle 1.

In the processes of step S200 to step S210 of the routine shown in FIG. 6, similar processes to the processes of step S100 to step S110 of the routine shown in FIG. 4 are executed. When the lane change availability determination unit 30 determines in the process of step S206 that a lane change is not available, the surrounding vehicle recognition unit 32 of the vehicle ECU 10 subsequently determines whether there is the front lateral vehicle 3 and there is no rear lateral vehicle 2 (step S212). As a result, when the determination is affirmative, the vehicle ECU 10 determines that a safety margin needs to be ensured in front of and to the side of the vehicle 1 while the vehicle 1 keeps traveling in the first lane, and then the process proceeds to the next step.

In the next step, the vehicle ECU 10 generates a lane keeping path (step S214). A process similar to the process of step S102 shown in FIG. 4 is executed. When the lane keeping path is generated in step S214, the speed generation unit 43 of the vehicle control unit 40 subsequently generates a front lateral margin ensuring speed (step S216). The speed generation unit 43 generates the front lateral margin ensuring speed for ensuring a safety margin for a lane change behind the front lateral vehicle 3 recognized by the surrounding vehicle recognition unit 32 while the vehicle 1 travels along the lane keeping path. Specifically, the speed generation unit 43 sets the front lateral margin ensuring speed to a speed lower than the speed of the front lateral vehicle 3 such that the inter-vehicle distance to the front lateral vehicle 3 increases.

As a result of the process of step S212, when the determination is negative, the surrounding vehicle recognition unit 32 of the vehicle ECU 10 subsequently determines whether there is no front lateral vehicle 3 and there is the rear lateral vehicle 2 (step S218).

As a result, when the determination is affirmative, the vehicle ECU 10 determines that a safety margin needs to be ensured behind and to the side of the vehicle 1 while the vehicle 1 keeps traveling in the first lane, and then the process proceeds to the next step.

In the next step, the vehicle ECU 10 generates a lane keeping path (step S220). A process similar to the process of step S214 is executed. When the lane keeping path is generated in step S220, the speed generation unit 43 of the vehicle control unit 40 subsequently generates a rear lateral margin ensuring speed (step S222). The speed generation unit 43 generates the rear lateral margin ensuring speed for ensuring a safety margin for a lane change in front of the rear lateral vehicle 2 recognized by the surrounding vehicle recognition unit 32 while the vehicle 1 travels along the lane keeping path. Specifically, the speed generation unit 43 sets the rear lateral margin ensuring speed to a speed higher than the speed of the rear lateral vehicle 2 such that the inter-vehicle distance to the rear lateral vehicle 2 increases.

As a result of the process of step S218, when the determination is negative, the process proceeds to step S224. In the processes of step S224 to step S228, similar processes to those of step S114 to step S118 shown in FIG. 4 are executed. In the process of step S230, a process similar to the process of step S102 shown in FIG. 4 is executed.

When the process of step S228 or step S230 is executed, the vehicle ECU 10 subsequently determines whether the remaining distance X is shorter than the predetermined second determination distance (step S232). The vehicle control unit 40 compares the remaining distance X acquired by the remaining distance acquisition unit 41 with the second determination distance. The second determination distance is set to, for example, a lower limit of the remaining distance required to attain an opportunity to make a lane change from the viewpoint of giving priority to maintaining smooth traffic. As a result, when the vehicle ECU 10 determines that the remaining distance X is shorter than the second determination distance, the speed generation unit 43 of the vehicle control unit 40 generates an inter-vehicle distance reduction speed (step S234). The speed generation unit 43 generates a speed for reducing the inter-vehicle distance to the front lateral vehicle 3 recognized by the surrounding vehicle recognition unit 32 while traveling along the lane keeping path, as the inter-vehicle distance reduction speed. Specifically, the speed generation unit 43 sets the rear lateral margin ensuring speed to a speed higher than the speed of the front lateral vehicle 3.

On the other hand, in the process of step S232, when the vehicle ECU 10 determines that the remaining distance X is not shorter than the second determination distance, the vehicle ECU 10 determines that the vehicle 1 does not need to induce the give-way action of the rear lateral vehicle 2, and then the process proceeds to the next step. In the next step, the speed generation unit 43 of the vehicle control unit 40 generates a lane keeping speed (step S236). A process similar to that of step S202 is executed.

When the process of step S204, step S210, step S216, step S222, step S234, or step S236 is executed, the vehicle ECU 10 subsequently controls the steering and speed of the vehicle 1 (step S238). A process similar to the process of step S120 shown in FIG. 4 is executed.

With such control, since the inter-vehicle distance reduction speed is generated depending on the remaining distance X, the possibility of completing a lane change with automated driving is raised.

What is claimed is:

1. A vehicle control system mounted on a host vehicle, the vehicle control system comprising:
    a vehicle recognition unit configured to recognize a rear lateral vehicle in an area rearward of the host vehicle, the rear lateral vehicle being included in nearby vehicles traveling in a second lane adjacent to a first lane in which the host vehicle travels;
    a remaining distance acquisition unit configured to acquire a remaining distance from a current position of the host vehicle to a position at which the host vehicle completes a lane change;
    a lane change availability determination unit configured to determine whether the lane change is available based on information acquired from the vehicle recognition unit; and
    a vehicle control unit configured to control, when the lane change availability determination unit determines that the lane change is not available and the remaining distance is shorter than a first determination distance, steering of the host vehicle such that a position of the host vehicle in a vehicle width direction becomes a position closer to the second lane than a position when the remaining distance is longer than or equal to the first determination distance.

2. The vehicle control system according to claim 1, wherein:
    the vehicle recognition unit is configured to recognize a horn lateral vehicle in an area forward of the host vehicle, the front lateral vehicle being included in the nearby vehicles traveling in the second lane; and
    the vehicle control unit is configured to control, a speed of the host vehicle such that an inter-vehicle distance between the host vehicle and the front lateral vehicle is reduced when conditions i) to iii) are all met
    i) the lane change availability determination unit determines that the lane change is not available,
    ii) there are the front lateral vehicle and the rear lateral vehicle, and
    iii) the remaining distance is shorter than a predetermined second determination distance.

3. The vehicle control system according to claim 2, wherein the vehicle control unit is configured to control the speed of the host vehicle such that the inter-vehicle distance between the host vehicle and the front lateral vehicle increases when conditions iv) to vi) are all met
    iv) the lane change availability determination unit determines that the lane change is not available,
    v) there is the front lateral vehicle, and
    vi) there is no rear lateral vehicle.

4. The vehicle control system according to claim 2, wherein the vehicle control unit is configured to control the speed of the host vehicle such that an inter-vehicle distance between the host vehicle and the rear lateral vehicle increases when conditions vii) to ix) are all met
    vii) the lane change availability determination unit determines that the lane change is not available,
    viii) there is the rear lateral vehicle, and ix) there is no front lateral vehicle.

5. The vehicle control system according to claim 1, wherein the lane change availability determination unit is configured to calculate time to collision with one of a nearby vehicle included in the nearby vehicles traveling in the second lane and determine that the lane change is available when the time to collision is longer than predetermined determination time.

* * * * *